(12) United States Patent
Lang

(10) Patent No.: US 9,544,947 B2
(45) Date of Patent: Jan. 10, 2017

(54) TEMPERATURE MEASUREMENT IN A COOKING VESSEL

(75) Inventor: Steffen Lang, Oberderdingen (DE)

(73) Assignee: E.G.O. ELEKTRO-GERAETEBAU GMBH, Oberderdingen (DE)

( * ) Notice: Subject to any disclaimer, the term of this patent is extended or adjusted under 35 U.S.C. 154(b) by 381 days.

(21) Appl. No.: 14/234,042

(22) PCT Filed: Jul. 20, 2012

(86) PCT No.: PCT/EP2012/064320
§ 371 (c)(1),
(2), (4) Date: Mar. 12, 2014

(87) PCT Pub. No.: WO2013/014090
PCT Pub. Date: Jan. 31, 2013

(65) Prior Publication Data
US 2015/0033949 A1    Feb. 5, 2015

(30) Foreign Application Priority Data
Jul. 22, 2011  (DE) .................. 10 2011 079 689

(51) Int. Cl.
*H05B 6/06*  (2006.01)
*H05B 6/12*  (2006.01)
*A47J 27/00*  (2006.01)

(52) U.S. Cl.
CPC .............. *H05B 6/062* (2013.01); *A47J 27/004* (2013.01); *H05B 6/1236* (2013.01);
(Continued)

(58) Field of Classification Search
CPC ......... H05B 6/06; H05B 6/062; H05B 6/1254; H05B 6/1236; H05B 6/1209
(Continued)

(56) References Cited

U.S. PATENT DOCUMENTS 5,648,008 A * 7/1997 Barritt .................... H05B 6/062
219/626
5,928,551 A * 7/1999 Okabayashi ........... H05B 6/145
219/627

(Continued)

FOREIGN PATENT DOCUMENTS

CN    1495417 A    5/2004
CN    1883232 A    12/2006

(Continued)

OTHER PUBLICATIONS

International Searching Authority, International Search Report for International Application No. PCT/EP2012/064320, mailed Oct. 22, 2012, 7 pages, European Patent Office, The Netherlands.

(Continued)

*Primary Examiner* — Reginald L Alexander
(74) *Attorney, Agent, or Firm* — Alston & Bird LLP

(57) ABSTRACT

By performing a method for transmitting to a reading device data of a sensor that is allocated to an inductively heated cooking vessel, a high frequency control voltage is generated from a mains alternating voltage by means of a converter, wherein the high frequency control voltage is applied to an oscillator circuit having an induction heating coil in order to generate a high frequency magnetic alternating field for heating the cooking vessel. The method includes the steps: interrupting the applying of the high frequency control voltage to the oscillator circuit during a predefined first time region covering a zero crossing point of the mains alternating voltage in order to cause a self-resonant oscillation of the oscillator circuit; changing an impedance of an antenna that is inductively coupled to the induction heating coil, which antenna is allocated to the cooking vessel, in dependence upon the data of the sensor, which data is to be transmitted, during a second time region that lies within the first time region; and decoding the transmitted data of the sensor in the (Continued)

reading device, in that a resonant frequency, in particular a resonant frequency change, of the self-resonant oscillation of the oscillator circuit is evaluated.

14 Claims, 1 Drawing Sheet

(52) U.S. Cl.
CPC ....... *H05B 6/1254* (2013.01); *H05B 2213/06* (2013.01); *H05B 2213/07* (2013.01)

(58) Field of Classification Search
USPC ... 99/451; 219/620, 621, 622, 624, 625, 627
See application file for complete search history.

(56) References Cited

U.S. PATENT DOCUMENTS

| | | | |
|---|---|---|---|
| 6,316,753 B2 * | 11/2001 | Clothier | ........................ 219/621 |
| 6,904,378 B2 | 6/2005 | Schilling et al. | |
| 7,692,121 B2 * | 4/2010 | Pinilla | |
| 8,921,741 B2 * | 12/2014 | Broders | ............. G05D 23/1902 |
| | | | 219/488 |
| 9,125,242 B2 * | 9/2015 | Budgett | ................. A61M 1/127 |
| 2004/0054486 A1 | 3/2004 | Schilling et al. | |
| 2007/0080158 A1 | 4/2007 | Takimoto | |
| 2009/0055564 A1 | 2/2009 | Klotz et al. | |
| 2009/0057298 A1 | 3/2009 | Komma | |
| 2011/0000903 A1 | 1/2011 | Noguchi et al. | |
| 2011/0000904 A1 | 1/2011 | Sakakibara et al. | |
| 2011/0120989 A1 | 5/2011 | Schilling et al. | |
| 2012/0000903 A1 | 1/2012 | Baarman et al. | |

FOREIGN PATENT DOCUMENTS

| | | |
|---|---|---|
| CN | 100402998 C | 7/2008 |
| CN | 101374094 A | 2/2009 |
| CN | 101422077 A | 4/2009 |
| CN | 101946559 A | 1/2011 |
| DE | 102004033115 A1 | 2/2006 |
| DE | 102007036558 A1 | 2/2009 |
| DE | 102008054906 A1 | 6/2010 |
| DE | 102009047185 A1 | 6/2011 |
| EP | 0858722 B1 | 6/2000 |
| WO | WO 2007/122049 A1 | 11/2007 |
| WO | WO 2007/122050 A1 | 11/2007 |
| WO | WO 2010/069826 A1 | 6/2010 |
| WO | WO 2010/080738 A1 | 7/2010 |

OTHER PUBLICATIONS

State Intellectual Property Office of the P.R.C., First Office Action for Application No. 201280036360.6, Apr. 3, 2015, 16 pages, China.

* cited by examiner

TEMPERATURE MEASUREMENT IN A COOKING VESSEL

CROSS REFERENCE TO RELATED APPLICATIONS

This application is a National Stage application, filed under 35 U.S.C. §371, of International Application PCT/EP2012/064320, filed Jul. 20, 2012, which claims priority to German Application No. 10 2011 079 689.4, filed on Jul. 22, 2011, both of which are hereby incorporated by reference in their entirety.

TECHNOLOGICAL FIELD

The invention relates to a method for transmitting to a reading device data of a sensor that is allocated to an inductively heated cooking vessel, the invention further relates to a sensor device for an inductively heated cooking vessel, to a cooking vessel, to an induction heating device and to a system.

BACKGROUND

It is frequently necessary in order to precisely control and/or regulate a cooking process to ascertain an exact as possible temperature of the food that is being cooked.

DE 10 2009 047 185 A1 discloses a method and a device that render it possible by means of evaluating specific parameters to ascertain a temperature of a base of a cooking vessel that is being heated by means of an induction heating coil. However, in particular when preparing foodstuffs that contain starch and egg white, effects that are dependent upon the nature of the food that is being cooked render it difficult to unambiguously ascertain in dependence upon the temperature of the base of the cooking vessel the temperature of the food that is being cooked.

It can therefore be necessary to provide a dedicated sensor for measuring the temperature of the food that is being cooked. The temperature data and/or the data of the sensor must then be transmitted in a suitable manner to a reading device that then evaluates said data, by way of example, and controls a cooking process automatically taking into consideration the temperature of the food that is being cooked.

BRIEF SUMMARY

The object of the invention is to provide a method for transmitting to a reading device data of a sensor that is allocated to an inductively heated cooking vessel; a further object of the invention is to provide a sensor device for an inductively heated cooking vessel, a cooking vessel, an induction heating device and a system that renders it possible to transmit data of the sensor in a reliable and cost-effective manner.

The invention achieves this object by means of a method, a sensor device, a cooking vessel, an induction heating device and a system. Preferred embodiments are the subject matter of the claims, the wording of which becomes the content of the description by means of reference thereto hereinunder.

According to the method for transmitting data of a sensor to a reading device, wherein the sensor is allocated to an inductively heated cooking vessel in that said sensor is arranged by way of example within the cooking vessel in order to ascertain a temperature of the food that is being cooked, said food being located in the cooking vessel; a high frequency control voltage is conventionally generated from a mains alternating voltage by means of a converter, wherein the high frequency control voltage is applied to an oscillator circuit having an induction heating coil in order to generate a high frequency magnetic alternating field for heating the cooking vessel. The frequency of the control voltage can lie by way of example in a region between 20 kHz to 50 kHz. The applying of the high frequency control voltage to the oscillator circuit is interrupted during a predefined first time region covering in a symmetric or asymmetric manner a region of a zero crossing point of the mains alternating voltage in order to cause a self-resonant oscillation of the oscillator circuit. The first time region can by way of example be predefined by virtue of the fact that a magnitude of the mains alternating voltage during the first time region is less than a predefined value, by way of example is less than 25V, and in particular is less than 18V. During a second time region that lies completely within the first time range and that can be identical to the first time range, an impedance of an antenna that is coupled to the induction heating coil in an inductive and/or magnetic manner, which antenna is allocated to the cooking vessel or can be part of the cooking vessel, is changed in dependence of the data of the sensor, which data is to be transmitted, in other words a load modulation is performed. It is possible in the case of binary transmission of data by way of example to allocate an impedance of a high value to a logic one and an impedance of a low value to a logic zero, or vice versa. The impedance change causes a change in the resonant frequency of the self-resonant oscillation. Finally, the transmitted data of the sensor are decoded in the reading device, in that a resonant frequency, in particular a resonant frequency change, of the self-resonant oscillation of the oscillator circuit is determined and evaluated.

In a further embodiment, a circuit is supplied with operating energy in a contactless manner by means of the high frequency magnetic alternating field, said circuit being adapted to capture or determine the data of the sensor and, in dependence upon the data that is to be transmitted, to change the impedance of the antenna that is inductively coupled to the induction heating coil.

In a further embodiment, the data of the sensor are data relating to the temperature of food that is being cooked by means of the cooking vessel and/or in the cooking vessel.

In a further embodiment, the data of the sensor are transmitted by means of and/or as part of a data packet, wherein the data packet comprises at least one start bit and/or at least one backup or check bit.

The sensor device for an inductively heated cooking vessel comprises: at least one sensor for determining a measured variable relating to the cooking vessel, in particular a measured variable relating to a temperature of food that is being cooked, said food being heated by means of the cooking vessel; an antenna that may be inductively coupled to an induction heating coil of an induction heating device, wherein the induction heating device uses a converter to generate from a mains alternating voltage a high frequency control voltage for the induction heating coil; means for changing an impedance of the antenna; means for detecting a time region covering a zero crossing point of the mains alternating voltage, and a control device that is adapted to capture data of the at least one sensor and to control the means for changing the impedance of the antenna in such a manner that the impedance of the antenna is changed in dependence upon the captured data of the at least one sensor during the time region covering the or in the region of the zero crossing point of the mains alternating voltage.

In a further embodiment, the antenna comprises a coil and/or the antenna is a coil.

In a further embodiment, the means for changing the impedance of the antenna comprise a switching means that is connected between terminals of the coil in addition to additional components or without additional components.

In a further embodiment, the means for detecting the time range covering the zero crossing point of the mains alternating voltage comprise means for measuring an antenna voltage, in particular a rectified antenna voltage.

In a further embodiment, an energy supply device is provided which is adapted to generate operating energy for the sensor device from a signal that is available at the antenna.

A cooking vessel in accordance with the invention comprises an above-mentioned sensor device.

In a further embodiment, the antenna, in particular in the form of a single-winding or multi-winding coil, is arranged on or at a cooking vessel base and/or forms the particular part of the cooking vessel that is in contact with a glass ceramic plate of an induction cooking area when said cooking vessel is being operated.

The induction heating device in accordance with the invention comprises: an oscillator circuit that comprises an induction heating coil; a converter that generates from a mains alternating voltage a high frequency control voltage, wherein the high frequency control voltage is applied to the oscillator circuit in order to generate a high frequency magnetic alternating field for heating a cooking vessel; means for detecting a time region covering a zero crossing point of the mains alternating voltage and a control device that is adapted to interrupt the applying of the high frequency control voltage to the oscillator circuit during the time region covering the zero crossing point of the mains alternating voltage in order to cause a self-resonant oscillation of the oscillator circuit and/or to render it possible to determine a resonant frequency, in particular a resonant frequency change, of the self-resonant oscillation of the oscillator circuit and to decode transmitted data with the aid of the ascertained resonant frequency and/or the resonant frequency change.

The system in accordance with the invention is designed for implementing the above-mentioned method and comprises an above-mentioned sensor device and an above-mentioned induction heating device.

BRIEF DESCRIPTION OF THE SEVERAL VIEWS OF THE DRAWINGS

The invention is described hereinunder with reference to the drawings that represent preferred embodiments. In the drawings.

DETAILED DESCRIPTION

Figure 1:
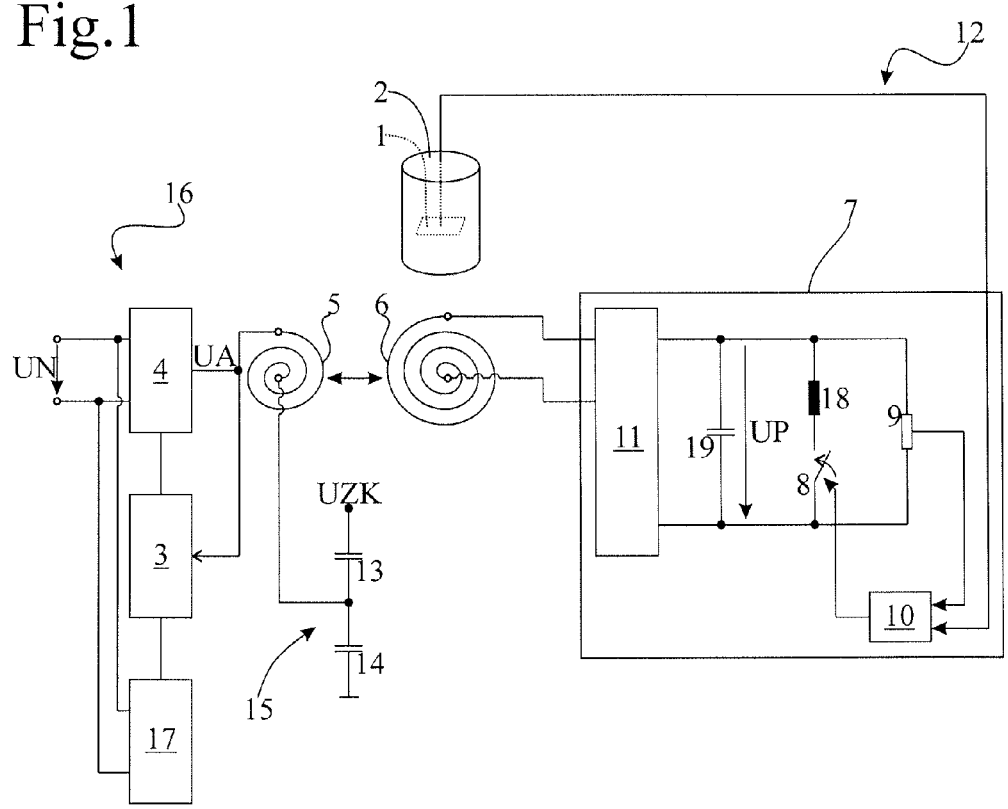
FIG. 1 illustrates schematically a system comprising an inductively heated cooking vessel having a sensor device and also an induction heating device.

FIG. 1 illustrates a system having an inductively heated cooking vessel 2, which comprises a sensor device 12, and an induction heating device 16.

The sensor device 12 comprises a temperature sensor 1 in the form of a conventional NTC temperature sensor for determining a temperature of food that is being cooked, said food being heated by means of the cooking vessel 2, wherein the sensor is arranged within the cooking vessel 2, by way of example within a hollow space, not illustrated, in the lateral walls or on the base of the cooking vessel 2 or connected to flexible supply lines freely movable within the cooking vessel 2, by way of example in the form of a core temperature sensor; an antenna in the form of a coil 6 that can be coupled in an inductive and/or magnetic manner to an induction heating coil 5 of the induction heating device 16; an energy supply device in the form of a rectifier, by way of example a bridge rectifier 11 that rectifies an output voltage of the coil 6, wherein the rectified voltage UP after smoothing by means of a smoothing capacitor 19 supplies the sensor device 12 and/or a fundamental circuit 7; means for changing an effective impedance of the coil 6 in the form of a switching means 8, by way of example in the form of a transistor, having an upstream limiting impedance 18, wherein the switching means 8 is connected between terminals of the coil 6 and/or the output of the rectifier 11; means for detecting a time range (cf. FIG. 2 "ZB2") in the region of a zero crossing point of the mains alternating voltage UN in the form of a voltage detector 9 for measuring a level of the rectified antenna voltage UP; and a control device in the form of a microcontroller 10 that is adapted to capture or determine data of the sensor 1 in a conventional manner, by way of example by means of an A/D conversion, and to control the switching means 8 in such a manner that the impedance of the coil 6 is changed in dependence upon the captured data of the sensor during the time range ZB2 in the time region of the zero crossing point of the mains alternating voltage UN.

The induction heating device 16 comprises an oscillator circuit 15, which comprises the induction heating coil 5 and capacitors 13 and 14, wherein the capacitors 13 and 14 are connected in a conventional manner between an intermediate circuit voltage UZK.

A conventional rectifier 4 generates from the mains alternating voltage UN a high frequency control voltage UA, by way of example by means of a half bridge, wherein the high frequency control voltage UA is applied to the oscillator circuit 15 in order to generate a high frequency magnetic alternating field for heating the cooking vessel 2.

The induction heating device 16 comprises in addition means 17 for detecting a time range (cf. FIG. 2 "ZB1") covering a zero crossing point of the mains alternating voltage UN. The time range ZB1 can be detected and/or defined by way of example by virtue of the fact that a magnitude of the mains alternating voltage UN during the time range ZB1 is less than a predefined value, by way of example less than 25V, in particular less than 18V. The means 17 monitor for this case the level of the mains alternating voltage UN and detect in this manner the time range ZB1 covering the zero crossing point of the mains alternating voltage UN.

Furthermore, a control device is provided in the form of a microcontroller 3 that is adapted to interrupt the applying of the high frequency control voltage UA to the oscillator circuit 15 during the time region ZB1 in order to cause a self-resonant oscillation of the oscillator circuit 15, to determine a resonant frequency change of the self-resonant oscillation of the oscillator circuit 15 and by means of the determined resonant frequency change to decode the data transmitted by the sensor device 12. The microcontroller 3 which is a component of the induction heating device 16 consequently fulfills conventional control functions of an induction heating device and in addition the function of a reading device that receives and suitably evaluates the transmitted data of the sensor 1. The induction heating coil 5 is used simultaneously as a receiving antenna so that a specific receiving antenna and a separate reading device are omitted.

The sensor device 12 can be a component of the cooking vessel 2 or can be releasably connected to the cooking vessel 2, wherein the coil 6 is provided on a base of the cooking vessel 2 and the remaining components can be integrated by way of example in a handle, not illustrated, or a hollow chamber, not illustrated, of the cooking vessel 2, where said components are protected from high temperatures. In the case of a releasable connection, the sensor device 12 or a part of the sensor device 12 can be integrated by way of example in a synthetic material frame that is plugged onto a conventional cooking vessel.

Figure 2:
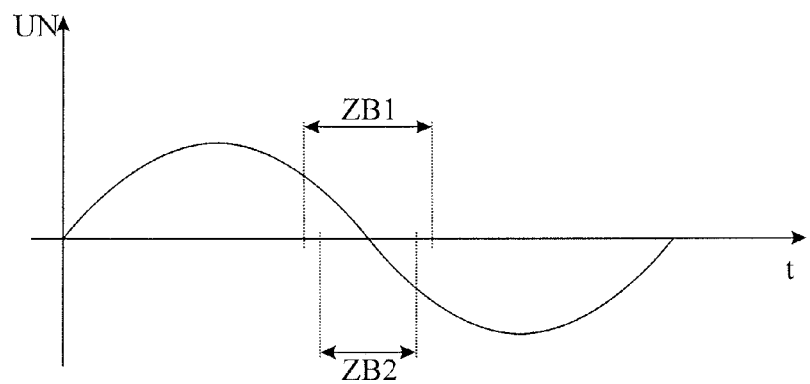
FIG. 2 illustrates variation in time of a mains alternating voltage and a first time range of a self-resonant oscillation and a second time range during which data of the sensor is transmitted.

FIG. 2 illustrates for the sake of clarity a time profile of the mains alternating voltage UN and also the time range ZB1 of the self-resonant oscillation of the oscillator circuit 15 and the time range ZB2 during which data of the sensor are transmitted.

It goes without saying that it is also possible to provide in place of a single sensor several sensors that can then be arranged at different positions of the cooking vessel 2. It is possible in this case that an average value that has been calculated over all the sensors is transmitted to the reading device 3 or that the data of all sensors are transmitted to the reading device.

The induction heating device 16 in accordance with the invention is also suitable for heating cooking vessels that do not have a sensor device 12 in accordance with the invention. For this case, the induction heating device 16 and/or its reading device 3 recognize(s) the absence of data of the sensor and then change(s) to a conventional operating mode in which the temperature is not measured by means of a sensor.

On the other hand, the sensor device in accordance with the invention 12 can also be operated on a conventional induction heating device. For this case or fundamentally, the sensor device 12 can further comprise a sound generator that in order to prevent the cooking vessel 2 being damaged emits an acoustic warning signal if a sensor limit temperature is exceeded.

It goes without saying that in addition to or as an alternative to temperature sensors, sensors for other measured variables can also be provided, by way of example pressure sensors in the case of steam pressure cooking vessels, etc.

The invention claimed is:

1. A method for transmitting to a reading device data of a sensor that is allocated to an inductively heatable cooking vessel, wherein:
   generating a high frequency control voltage from a mains alternating voltage (UN) by means of a convertor, wherein the high frequency control voltage is applied to an oscillator circuit having an induction heating coil in order to generate a high frequency magnetic alternating field for heating the cooking vessel;
   interrupting the applying of the high frequency control voltage to the oscillator circuit during a predefined first time region covering a zero crossing point of the mains alternating voltage in order to cause a self-resonant oscillation of the oscillator circuit;
   changing an impedance of an antenna that is inductively coupled to the induction heating coil, which antenna is allocated to the cooking vessel, in dependence upon the data of the sensor, which data is to be transmitted via the antenna, during a second time region that lies within the first time region; and
   decoding the transmitted data of the sensor in the reading device, in that a resonant frequency, or a resonant frequency change, of the self-resonant oscillation of the oscillator circuit is evaluated.

2. The method as claimed in claim 1, further comprising:
   supplying a circuit with operating energy in a contactless manner by means of the high frequency magnetic alternating field, said circuit being adapted to capture the data of the sensor and, in dependence upon the data that is to be transmitted, to change the impedance of the antenna that is inductively coupled to the induction heating coil.

3. The method as claimed in claim 1, wherein the data of the sensor is data relating to the temperature of food, said food being heated by means of the cooking vessel.

4. The method as claimed in claim 1, wherein the data of the sensor are transmitted by means of a data packet, wherein the data packet comprises at least one start bit or at least one backup bit.

5. A sensor device for an inductively heatable cooking vessel, said sensor device comprising:
   a sensor for measuring a measured variable relating to the cooking vessel, in particular a measured variable relating to a temperature of food, said food being heated by means of the cooking vessel;
   an antenna that can be inductively coupled to an induction heating coil of an induction heating device, wherein the induction heating device uses a converter to generate from a mains alternating voltage a high frequency control voltage for the induction heating coil;
   means for changing an impedance of the antenna;
   means for detecting a time region (ZB2) covering a zero crossing point of the mains alternating voltage; and
   a control device that is adapted to capture data of the sensor and to control the means for changing the impedance of the antenna in such a manner that the impedance of the antenna is changed in dependence upon the captured data of the sensor, which data is to be transmitted via the antenna during the time region covering the zero crossing point of the mains alternating voltage.

6. The sensor device as claimed in claim 5, wherein the antenna comprises a coil.

7. The sensor device as claimed in claim 6, wherein the means for changing the impedance of the antenna comprises a switching means that is connected between terminals of the coil.

8. The sensor device as claimed in claim 5, wherein the means for detecting the time region covering the zero crossing point of the mains alternating voltage comprises means for measuring an antenna voltage, comprising an antenna voltage that has been rectified.

9. The sensor device as claimed in claim 5, further comprising:
   an energy supply device that is adapted to generate operating energy for the sensor device from a signal that is available at the antenna.

10. A cooking vessel comprising a sensor device as claimed in claim 5.

11. The cooking vessel as claimed in claim 10, wherein the antenna, in the form of a coil, is arranged on a cooking vessel base.

12. An induction heating device comprising:
an oscillator circuit that comprises an induction heating coil;
a converter that generates from a mains alternating voltage a high frequency control voltage, wherein the high frequency control voltage is applied to the oscillator circuit in order to generate a high frequency magnetic alternating field for heating a cooking vessel;
means for detecting a time region covering a zero crossing point of the mains alternating voltage; and
a control device that is adapted to:
interrupt the applying of the high frequency control voltage to the oscillator circuit during the time region covering the zero crossing point of the mains alternating voltage in order to cause a self-resonant oscillation of the oscillator circuit;
determine a resonant frequency, in particular a resonant frequency change, of the self-resonant oscillation of the oscillator circuit; and
decode transmitted data of a sensor, received from an antenna inductively coupled to the induction heating coil, that is allocated to an inductively heated cooking vessel in response to the determined resonant frequency or the resonant frequency change.

13. A system that is designed for implementing the method as claimed in claim 1, comprising:
the sensor device as claimed in claim 5 and
the induction heating device as claimed in claim 12.

14. The system as claimed in claim 13, comprising the cooking vessel as claimed in claim 10.

* * * * *